Patented Mar. 15, 1927.

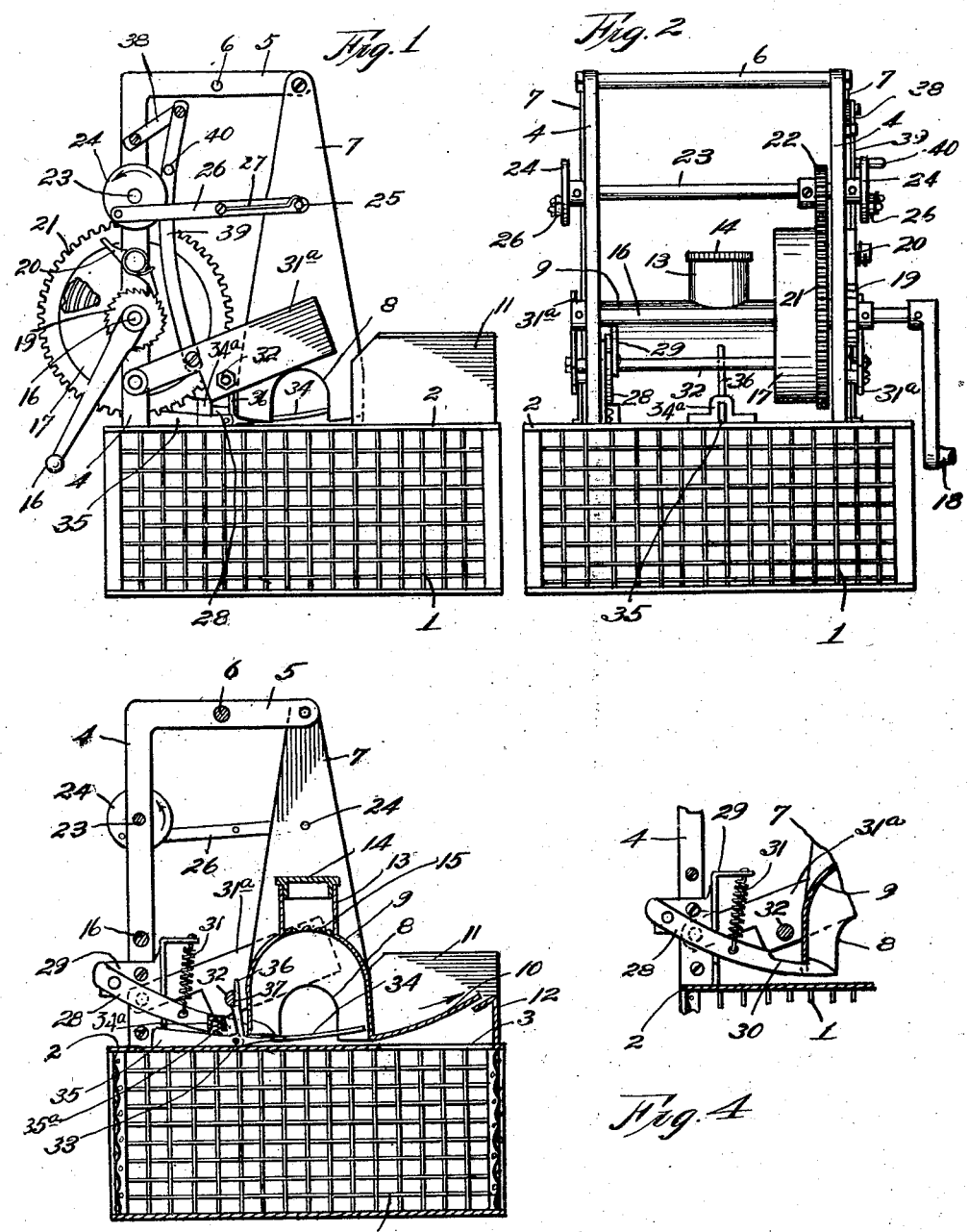

1,620,950

UNITED STATES PATENT OFFICE.

SAMUEL M. COFFMAN, OF KANSAS CITY, AND WILLIAM M. ELDER, OF BRAYMER, MISSOURI.

TRAP.

Application filed April 5, 1926. Serial No. 99,866.

This invention relates to rodent traps, and has for its object to produce a spring-operated trap for the catching of rats, mice and other rodents, which is self-setting and will operate numerous times without attention, that is as long as the spring power mechanism is under tension. Another object is to produce a trap of the character outlined which cannot be tripped or released without the rodent entering into a movable container which when tripped, ejects or throws the rodent into a cage. Another object is to provide means for automatically closing the entrance to the trap as the tripping action occurs and unclosing such opening as the resetting action takes place.

A still further object is to produce a strong, durable, efficient and comparatively inexpensive trap of the general character outlined, and in order that it may be fully understood, reference is to be had to the accompanying drawing, in which:—

Figure 1 is a side elevation of a trap embodying the invention.

Figure 2 is a rear elevation of the same.

Figure 3 is a central vertical section through the trap to illustrate the relay catch.

Figure 4 is an enlarged section to illustrate the principal catch used to hold the main compartment against movement.

In the said drawing, where like reference characters identify corresponding parts in all of the figures, 1 indicates a cage of any suitable dimensions, closed at its bottom and sides and provided with a top 2 formed with a slot or opening 3 for the entry of trapped rodents, as will hereinafter appear.

Mounted on the top 2 adjacent its rear corners, is a pair of uprights 4, formed at their upper ends with forward extensions 5 rigidly braced by a transverse rod 6. Pivotally mounted at the extremity of the extensions 5 is a pair of relatively triangular shaped plates 7 terminating just short of the top of the trap and formed with entry openings 8 for the admittance of rodents.

The plates 7 conjointly carry at their lower ends an arch shaped bottomless container 9 formed along one of its side edges with a curved extension 10 normally closing the opening 3, it being noted that said opening is formed with a pair of end walls 11 and a side wall 12. The center of the arch container carries a tubular bait container 13 having a removable top 14 and closed at its bottom with a screen 15. It will be evident that upon the swinging of the container in the direction of the arrow, Figure 3, any animal or object within the container will be thrown or swept forward and through the opening 3 into the cage, the container returning to position with its extension 10 reclosing the opening 3 to prevent the escape of the rodent or rodents within the cage.

The power and tripping mechanism for the operation of the trap is as follows:—A transverse shaft 16 carried by the uprights 4. Secured to said shaft 16 is a spring-carrying casing 17, said spring mechanism being wound up or tensioned by means of the handle 18 secured to one end of the shaft 16, reverse operation of the spring being prevented by the ratchet wheel 19 on the shaft 16, and the spring dog or detent 20 on the upright 4 adjacent the spring, as illustrated. As the power mechanism is of conventional clockwork type, illustration in further detail is not deemed necessary.

Power from the spring to the container is transmitted through a large gear 21 on the spring shaft, meshed with a small gear 22 on an auxiliary shaft 23 journaled in the uprights 4. The shaft 23 projects through the uprights at its opposite ends and pinned to the ends of said shaft is a pair of disks 24. The triangular plates 7 of the container are provided with projecting pins 25. Secured at one end on the pins 25 and at their other ends to the disks 24 is a pair of links 26 for the operation of the container. The links are removably secured to the pins 25 by means of hook members 27, it being possible to unhook the hook members, remove the links 26, and then manually swing the container forwardly and upwardly to uncover the opening 3 in the top of the trap for the removal of any rodents which may have been caught.

In order to control the operation of the container by the spring mechanism 17, a catch 28 is pivoted at its rear end on a bracket 29 carried at the base of one of the uprights 4, said catch being curved and extending downwardly and forwardly and being formed with a notch 30 for engagement with the lower edge of the rear wall of the container, see Figure 4. The catch 28 is normally held in elevated position by means of a spring 31 secured at one end to an overhanging portion of the bracket 29. It will be apparent from a consideration of the device as above-described, that if the notch 30 of the catch 28 is tripped from engagement with the container wall, the spring mechanism 17 will, through the disks 24 and links 26, effect movement of the container in the direction of the arrow, Figure 3, and in the reverse direction until again engaged by the catch 28, as hereinafter appears. It will also be noted that the side walls 11 of the opening 3 close the entrance openings 8 in the container when the latter is in its forward position.

It will be apparent that a greater force is required to trip the catch 28 when the spring is newly wound than when the spring is partially unwound. In order to overcome this difficulty, we have provided the trap with a relay catch, always requiring but slight force to effect its release, said relay releasing a weighted member for the operation of the main catch 28.

The relay catch comprises a pair of gate or weight members 31ª pivoted at their rear ends to the base of the uprights 4, said gates being secured together by a cross rod 32. pivoted to the top of the cage at 33 is a tread or trip member 34 extending into the trap directly under the bait container, see Figure 3, in such a position that it will be impossible for a rodent to enter the container without treading on the trip. The rear end 35 of the trip 34, extends behind the pivot 33 and normally rests on the top 2 of the cage and extends below an internally recessed bridge 34ª. Fitted within the recess of the bridge is an expansion spring 35ª which normally maintains the rear end 35 of the trip 34 in depressed position. Extending upward from the pivotal point 33 of the trip is a catch 36 having a notch 37 for engagement with the rod 32 to maintain the gates in elevated position, as described.

In order to return the gates to elevated position upon the operation of the trap, the upper end of one of the uprights 4 carries a pivoted link 38, and pivoted to said link is a long curved link 39, pivotally connected at its lower end to one of the gates 31ª. At a suitable point lengthwise of the link 38, it is provided with a projecting pin 40 in position to be struck by the link 26 when operated by a disk 24, thus elevating the gates, the parts being caught and held in such elevated position through the relay catch 36 of the relay trip 34.

The operation of the trap is substantially as follows:—A rodent enters the container 9 through one of the openings 8, and in an endeavor to reach the bait held in the container 13, treads upon the trip 34. A very light pressure is required to depress said trip. Immediately the catch 36 is withdrawn from supporting engagement with the rod 32, the gates 31ª fall under gravity, and incidentally effect the closing of the openings 8.

The gates in their downward movement bring the cross rod 32 into contact with the end of the catch 28, see Figure 4. This depresses the catch and releases the container 9 for actuation by the spring 17 on the shaft 16. The parts are so proportioned that one revolution of the disks 24 in the direction of the arrow, Figure 1, throws the compartment 9 forwardly and returns it to position, the link 26 in its movement striking the pin 40 on the curved link 38 and re-elevating the gates 31ª into position to be held by catch 36 on the relay trip 34, the main catch 28 being reset by its spring 31.

From the above description, it will be apparent that we have produced a trap of the character described which possesses all of the features of advantage pointed out as desirable, and while we have described and claimed the preferred embodiment of the invention, we reserve the right to make all changes properly falling within the spirit and scope of the appended claims.

We claim:—

1. In a trap, a cage provided with a normally closed entrance opening, a horizontally movable container for forcibly propelling an animal through said opening into the cage, power means for operating said container, and a trip for normally retaining said power means against operation.

2. In a trap, a cage provided with a normally closed entrance opening, a horizontally movable container for forcibly propelling an animal through said opening into the cage, power means for operating said container and returning same to normal position, and a trip for retaining said power means against operation.

3. In a trap, a cage provided with a normally closed entrance opening, an oscillating container overlying said cage for propelling an animal through said opening into the cage, power means for operating said container and returning same to normal position, a trip for holding said container against operation, and a relay trip for releasing said first-named trip.

4. In a trap, a cage provided with an entrance opening, an oscillating container overlying said cage and formed with an extension normally closing said opening, a spring, means adapted for rotation by said spring, a link connecting said container to said means, and a trip for operation by an animal for releasing said container to permit it to be oscillated by said spring.

5. In a trap, a cage provided with an entrance opening, an oscillating container overlying said cage and formed with an extension normally closing said opening, a spring, means adapted for rotation by said spring, a link connecting said container to said means, a latch normally holding the container against operation, a relay latch, and a gravity-operated weight for release by said relay latch and adapted to trip said first-named latch.

6. In a trap, a cage provided with an entrance opening, a pair of uprights at the top of said cage, a container pivotally secured to said uprights, power mechanism carried by said uprights, a pair of disks driven by said power mechanism, links connecting said container to said disks, a spring-actuated latch normally maintaining said container against operation, a weight for the operation of said latch, a relay latch maintaining said weight against movement, and a connection between said weight and disks whereby rotation of said disks shall effect elevation of the weight.

7. In a trap, a cage provided with an entrance opening, a horizontally oscillating container mounted on said cage and having a portion normally closing the entrance opening of said cage, power means for operating said container for forcibly expelling an animal therefrom through the opening into the cage, and a trip within the container to trip said power mechanism.

In witness whereof we hereunto affix our signatures.

SAMUEL M. COFFMAN.
WILLIAM M. ELDER.